United States Patent
Maltsev et al.

(10) Patent No.: US 7,251,282 B2
(45) Date of Patent: Jul. 31, 2007

(54) RECEIVER AND METHOD TO DETECT AND SYNCHRONIZE WITH A SYMBOL BOUNDARY OF AN OFDM SYMBOL

(75) Inventors: Alexander A. Maltsev, Nizhny Novgorod (RU); Andrey V. Pudeyev, Nizhny Novgorod (RU); Alexei M. Soupikov, Nizhny Novgorod (RU); Sergey A. Triaspolsky, Nizhny Novgorod (RU)

(73) Assignee: Intel Corporation, Santa Clara, CA (US)

(*) Notice: Subject to any disclaimer, the term of this patent is extended or adjusted under 35 U.S.C. 154(b) by 778 days.

(21) Appl. No.: 10/675,213

(22) Filed: Sep. 30, 2003

(65) Prior Publication Data

US 2004/0190560 A1    Sep. 30, 2004

Related U.S. Application Data

(63) Continuation of application No. PCT/RU03/00124, filed on Mar. 28, 2003.

(51) Int. Cl.
*H04K 1/10*    (2006.01)
*H04B 1/69*    (2006.01)

(52) U.S. Cl. ........................... 375/260; 375/147

(58) Field of Classification Search ............... 375/260, 375/130, 147, 150, 145, 316, 355; 370/509, 370/510

See application file for complete search history.

(56) References Cited

U.S. PATENT DOCUMENTS 5,652,772 A    7/1997    Isaksson et al. ............ 375/367

(Continued)

FOREIGN PATENT DOCUMENTS

EP    0645917 A2    3/1995

(Continued)

OTHER PUBLICATIONS

Keller, T., et al., "Orthogonal Frequency Division Multiplex Synchronization Techniques for Frequency-Selective Fading Channels", *IEEE Journal on Selected Areas in Communications*, vol. 19, No. 6 (Jun. 2001), 999-1008.

(Continued)

*Primary Examiner*—Khai Tran
(74) *Attorney, Agent, or Firm*—Schwegman, Lundberg, Woessner & Kluth, P.A.

(57) ABSTRACT

An OFDM packet is initially detected by auto-correlating short training symbols to generate an initial packet detection signal. The initial packet detection signal may be used to initiate a coarse timing synchronization process, which may use a short symbol matched filter. A coarse timing signal may be generated from at least some of the short training symbols by correlating sampled short training symbols with short filter matched coefficients. The coarse-timing signal may be used to initiate the operation of a fine timing synchronization process, which may use a long symbol matched filter. A fine timing signal may be generated from at least some of the long training symbols by correlating sampled long training symbols with long filter-matched coefficients. The fine timing signal may be used to initiate channel estimation by performing a Fast Fourier Transform (FFT) operation on the long training symbols. The fine timing signal may also be used to initiate data signal processing using the channel estimation and may include starting an FFT operation on data symbols.

27 Claims, 6 Drawing Sheets

U.S. PATENT DOCUMENTS

| | | | | |
|---|---|---|---|---|
| 5,732,113 | A | 3/1998 | Schmidl et al. | 375/355 |
| 6,295,326 | B1 | 9/2001 | Tonissen et al. | 375/350 |
| 6,320,915 | B1 | 11/2001 | Stott et al. | 375/340 |
| 6,359,938 | B1 | 3/2002 | Keevill et al. | 375/316 |
| 6,363,128 | B1 | 3/2002 | Isaksson et al. | 375/355 |
| 6,658,063 | B1* | 12/2003 | Mizoguchi et al. | 352/260 |
| 7,039,000 | B2* | 5/2006 | You et al. | 370/203 |
| 2002/0159533 | A1 | 10/2002 | Crawford | 375/260 |
| 2002/0181509 | A1 | 12/2002 | Mody et al. | 370/480 |
| 2004/0001563 | A1 | 1/2004 | Scarpa | 375/326 |
| 2004/0005018 | A1* | 1/2004 | Zhu et al. | 375/340 |

FOREIGN PATENT DOCUMENTS

| | | |
|---|---|---|
| EP | 0825737 A1 | 2/1998 |
| EP | 0933903 A2 | 8/1999 |
| EP | 1005204 A2 | 5/2000 |
| EP | 1071251 A2 | 1/2001 |
| EP | 1083683 A2 | 3/2001 |
| EP | 1168745 A1 | 1/2002 |
| EP | 1220505 A2 | 7/2002 |
| EP | 1313283 A2 | 5/2003 |

OTHER PUBLICATIONS

Chen, Bor-Sen, et al., "Frequency Offset Estimation in an OFDM System", *2001 IEEE Third Workshop on Signal Processing Advances, Wireless Communications 2001*, (2001), 150-153.

Dacca, M. R., et al., "Frequency Offset Tracking in OFDM Based on Multicarrier PLL", *21st Century Military Communications Conference Proceedings*, vol. 2, (2000),912-916.

Larsson, Erik G., et al., "Joint symbol timing and channel estimation for OFDM based WLANs", *IEEE Communications Letters*, vol. 5, No. 8, (Aug. 2001),325-327.

Li, Jian, et al., "Carrier Frequency Offset Estimation for IFDM-Based WLANs", *IEEE Signal Processing Letters*, vol. 8, No. 3, (Mar. 2001)80-82.

Matheus, Kirsten, et al., "Parameter Optimization for Decision Directed Frequency Tracking for Coherent OFDM", *Global Telecommunications Conference, 2000, IDDD*, vol. 3, (2000),1402-1406.

Morelli, Michele, et al., "Carrier-Frequency Estimation for Transmission over Selective Channels", *IEEE Transactions on Communications*, vol. 48, No. 9, (Sep. 2000), 1580-1589.

Perets, R., et al., "A New Phase and Frequency Offset Estimation Algorithm for OFDM Systems Applying Kalman Filter", *22nd Convention of Electrical and Electronics Engineers in Israel*, IEEE, XP010631136, (Dec. 1, 2002), 300-302.

Schmidl, Timothy M., "Robust Frequency and Timing Synchronization for OFDM", *IEEE Transactions on Communications*, vol. 45, No. 12, (Dec. 1997), 1613-1621.

* cited by examiner

RECEIVER AND METHOD TO DETECT AND SYNCHRONIZE WITH A SYMBOL BOUNDARY OF AN OFDM SYMBOL

CROSS-REFERENCE TO RELATED APPLICATIONS

This application is a continuation under 37 C.F.R. 111(a) of International Application Ser. No. PCT/RU03/00124, filed Mar. 28, 2003, now published as International Application No. WO 2004/086708 on Oct. 7, 2004, which is incorporated herein by reference.

This application is related to the following co-pending, commonly assigned U.S. patent applications entitled "SYSTEM AND METHOD FOR TWO CHANNEL FREQUENCY OFFSET ESTIMATION OF OFDM SIGNALS", Ser. No. 10/675,240, filed on Sep. 30, 2003, and "SYSTEM AND METHOD FOR ADAPTIVE PHASE COMPENSATION OF OFDM SIGNALS", Ser. No. 10/675,215, filed on Sep. 30, 2003. These commonly assigned patent applications are incorporated herein by reference.

TECHNICAL FIELD

The present invention pertains to wireless communications, and in particular to orthogonal frequency division multiplexed (OFDM) communications.

BACKGROUND

Orthogonal frequency division multiplexing (OFDM) is a multi-carrier transmission technique that uses orthogonal subcarriers to transmit information within an available spectrum. Because the subcarriers may be orthogonal to one another, they may be spaced much more closely together within the available spectrum than, for example, the individual channels in a conventional frequency division multiplexing (FDM) system. To help achieve orthogonality, a subcarrier may have a null at the center frequency of the other subcarriers. Orthogonality of the subcarriers may help prevent inter-subcarrier interference within the system. Before transmission, the subcarriers may be modulated with a low-rate data stream. The transmitted symbol rate of OFDM symbols may be low, and thus the transmitted OFDM signal may be highly tolerant to multipath delay spread within the channel. For this reason, many modem digital communication systems are turning to OFDM as a modulation scheme for signals that need to survive in environments having multipath reflections and/or strong interference. Many wireless communication standards have already adopted OFDM including, for example, the IEEE 802.11a standard, the Digital Video Broadcasting Terrestrial (DVB-T) broadcasting standard, and the High performance radio Local Area Network (HiperLAN) standard. In addition, several industry consortia, including the Broadband Wireless Internet Forum and the OFDM Forum, are proposing OFDM for fixed wireless access systems.

One problem with OFDM systems is that they may be more sensitive to phase noise and frequency offset relative to single carrier systems. Unlike single carrier systems, phase noise and frequency offset in OFDM systems introduce interference, including intercarrier interference and intersymbol interference. To demodulate the subcarriers, an OFDM receiver may perform a synchronization to determine the location of symbol boundaries and timing instants. Inaccurate synchronization may result in a reduced or loss of orthogonality between the subcarriers resulting intercarrier and/or intersymbol interference and reduction in system performance. Achieving accurate synchronization in an OFDM system may be more critical than in single carrier systems. Conventional OFDM systems have used a cyclic prefix and/or special OFDM training symbols to help achieve symbol timing and frequency synchronization, however channel effects, such as linear distortion, in a multipath channel make this a difficult task.

Another difficulty with OFDM systems is properly detecting an OFDM packet. Channel effects, for example, increase the probability of false packet detection, which may be referred to as a false alarm probability. A high false alarm probability may result in reduced system performance.

BRIEF DESCRIPTION OF THE DRAWINGS

The appended claims are directed to some of the various embodiments of the present invention. However, the detailed description presents a more complete understanding of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

Figure 1:
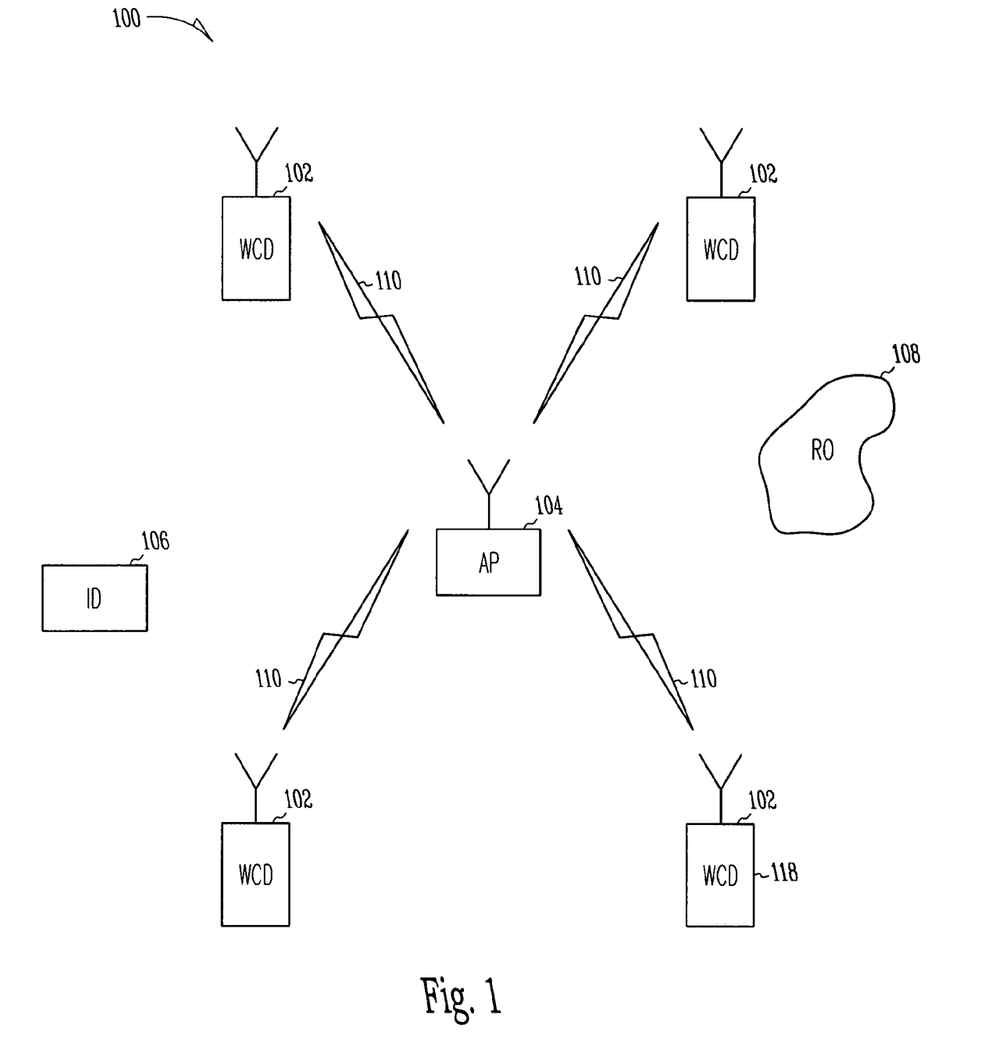
FIG. 1 illustrates a wireless communication environment in which embodiments of the present invention may be practiced.

The present invention pertains to wireless communications, and in one embodiment, the present invention pertains to detection and synchronization with a symbol boundary of an orthogonal frequency division multiplexed (OFDM) symbol. FIG. 1 illustrates a wireless communication environment in which embodiments of the present invention may be practiced. Communication environment 100 includes one or more wireless communication devices (WCD) 102 which may communicate with access point (AP) 104 over communication links 110, which may be bi-directional OFDM links. WCDs 102 may include, for example, personal digital assistants (PDAs), laptop and portable commuters with wireless communication capability, web tablets, wireless telephones, wireless headsets, pagers, instant messaging devices, MP3 players, digital cameras, and other devices that may receive and/or transmit information wirelessly. WCDs 102 may communicate with AP 104 using a multi-carrier transmission technique, such as an orthogonal frequency division multiplexing (OFDM) technique, that uses orthogonal subcarriers to transmit information within an assigned spectrum. WCDs 102 and AP 104 may also implement one or more communication standards, such as one of the IEEE 802.11a, b or g standards, the Digital Video Broadcasting Terrestrial (DVB-T) broadcasting standard, and the High performance radio Local Area Network (HiperLAN) standard. Other local area network (LAN) and wireless area network (WAN) communication techniques may also be suitable for communication over links 110.

In addition to facilitating communications between WCDs 102, in one embodiment AP 104 may be coupled with one or more networks, such as an intranet or the Internet, allowing WCDs 102 to access such networks. For convenience, the term downstream is used herein to designate communications in the direction from AP 104 to WCDs 102 while the term upstream is used herein to designate communications in the direction from WCDs 102 to AP 104, however, the terms downstream and upstream may be interchanged. In one embodiment, upstream and downstream communications may be time division multiplexed (TDM), although this is not a requirement. In another embodiment, downstream communications may be broadcast to more than one of WCDs 102 and may be frequency division multiplexed (FDM). WCDs 102 may support duplex communications utilizing different spectrum for upstream and downstream communications, although this is not a requirement. In one embodiment, upstream and downstream communications may share the same spectrum for communicating in both the upstream and downstream directions. Although FIG. 1 illustrates point-to-multipoint communications, embodiments of the present invention are suitable to both point-to-multipoint and point-to-point communications.

Communication environment 100 may also include one or more reflecting objects (RO) 108 which may cause multipath reflections and frequency selective fading within the spectrum utilized by AP 104 and WCDs 102. Communication environment 100 may also include one or more in-band interfering devices (ID) 106 which generate interference within the spectrum utilized by AP 104 and WCDs 102. Due to reflecting objects 108 and interfering devices 106, WCD 102 and AP 104 may experience channel fading, multipath components, and interference conditions unique to the particular WCD.

WCDs 102 may include an OFDM transmitter and an OFDM receiver, as well as other functional elements that allow it to serve a primary purpose, such as operating as a PDA, a laptop or portable computer with wireless communication capability, a web tablet, a wireless telephone, a wireless headset, a pager, an instant messaging device, an MP3 player, a digital camera, or other device that may receive and/or transmit information wirelessly. In accordance with embodiments of the present invention, WCDs detect OFDM packets and synchronize to OFDM symbol boundaries. In one embodiment, OFDM packets may be preceded by a sequence of training symbols, which may be used for packet detection and synchronization. The sequence may include a plurality of short training symbols followed by a plurality of long training symbols. In one embodiment, the sequence of training symbols may be in accordance with an IEEE 802.11a standard and may have as set of known characteristics. In another embodiment, the sequence of training symbols may be in accordance with a HiperLAN standard and may have other sets of known characteristics.

In one embodiment, an OFDM packet is initially detected by autocorrelating at least one of a plurality of received short training symbols to generate an initial packet detection signal. The initial packet detection signal may be used to initiate a coarse timing synchronization process, which may use a short symbol matched filter. The short symbol matched filter may be substantially matched to the short training symbols. A coarse timing signal may be generated from at least some of the short training symbols by correlating sampled short training symbols with short filter matched coefficients. The coefficients may be complex conjugates of the known short training symbols. The coarse-timing signal may be used to initiate the operation of a fine timing synchronization process, which may use a long symbol matched filter. The long symbol matched filter may be substantially matched to long training symbols. A fine timing signal may be generated from at least some of the long training symbols by correlating sampled long training symbols with long filter matched coefficients. The coefficients may be complex conjugates of the known long training symbols. The fine timing signal may used to initiate channel estimation and data signal processing including the start of Fast Fourier Transform (FFT) operations on data symbols.

Figure 2:
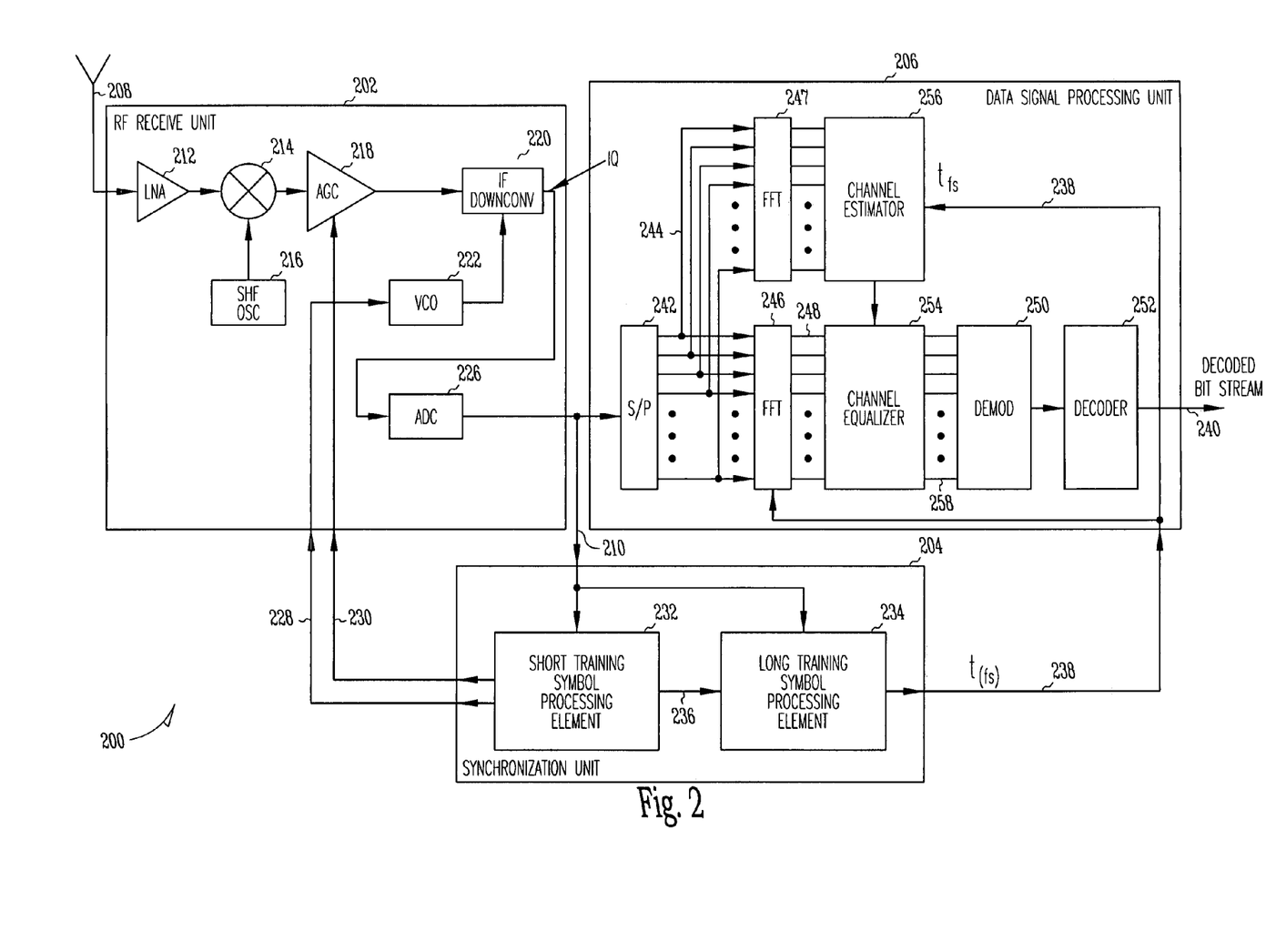
FIG. 2 is a highly simplified functional block diagram of an OFDM receiver in accordance with an embodiment of the present invention.

FIG. 2 is a highly simplified functional block diagram of an OFDM receiver in accordance with an embodiment of the present invention. OFDM receiver 200 may be part a transceiver of WCD 102 (FIG. 1) or may be part of a stand-alone receiver. OFDM receiver 200 may include RF receive unit 202, synchronization unit 204 and data symbol processing unit 206. RF receive unit 202 receives signals through antenna 208 and generates serial symbol stream 210 representing OFDM symbols. Antenna 208 may be, for example, a dipole antenna, monopole antenna loop antenna, microstrip antenna or other type of antenna suitable for reception and/or transmission of OFDM signals. In one embodiment, an OFDM packet may include a plurality of short training symbols and a plurality of long training symbols followed by data symbols.

In one embodiment, the received signal may have a carrier frequency ranging between 5 to 6 GHz, although embodiments of the present invention are equally suitable to carrier frequencies, for example, ranging between 2 and 20 GHz. An OFDM signal may include up to a hundred or more subcarriers. The short training symbols may be transmitted on a portion of the subcarriers, and data symbols may contain one or more known pilot subcarriers although this is not a requirement. In one embodiment, the long training symbols may have a duration of approximately 4 microseconds and the short training symbols may have a duration of approximately one microsecond.

RF receive unit 202 may perform a two-stage down conversion. RF receive unit 202 may include low-noise amplifier (LNA) 212 and RF down converter 214. RF down converter 214 may generate an intermediate frequency (IF) signal using signals from oscillator 216. Oscillator 216 may be fixed frequency heterodyne oscillator. Automatic gain control (AGC) element 218 may adjust a power level for IF down converter 220 in response to AGC signal 228 from synchronization unit 204. IF down converter may generate in-phase (I) signals and quadrature phase (Q) signals at zero frequency using a frequency controllable device such as voltage-controlled oscillator (VCO) 222, which may be responsive to VCO signal 230. VCO signal 230 may be a part of a feedback loop and provided by synchronization unit 204. In one embodiment, VCO signal 230 may be set upon detection of an OFDM packet and may remain constant for the duration of the OFDM packet. The in-phase (I) signals and quadrature phase (Q) signals, provided by IF down converter 220, may be sampled and converted to a digital bit stream by analog to digital converter (ADC) 226.

Synchronization unit 204 performs packet detection and synchronization with OFDM symbol boundaries and may initiate data processing by data symbol processing unit 206. Synchronization unit 204 may include short training symbol processing element 232 to utilize at least some of the short training symbols in serial symbol stream 110 to initially detect an OFDM packet and generate an initial packet detection signal at time ($t_{det}$) indicating initial detection of an OFDM packet. Short training symbol processing element 232 may use measurements from the short training symbols to estimate signal power for controlling AGC 218 with AGC signal 228. Short training symbol processing element 232 may also use measurements from the short training symbols to perform a coarse frequency offset (CFO) estimate and generate VCO signal 230 for tuning VCO 222. In one embodiment, detection, power estimation and coarse frequency offset estimation are performed within seven of the short training symbols. In response to initial packet detection, short training symbol processing element 232 may also utilize at least some of the short training symbols to generate coarse timing signal 236 at time ($t_{cs}$) which may indicate an end of the short training symbols and beginning of the long training symbols and data symbols. Synchronization unit 204 may also include long training symbol processing element 234 which may utilize at least some of the long training symbols received from RF receive unit 202 to perform a fine timing synchronization operation to generate fine timing signal 238 at time ($t_{fs}$) in response to coarse timing signal 236.

Data symbol processing unit 206 processes serial symbol stream 210 of OFDM symbols to generate bit stream 240. Data symbol processing unit 206 may include serial to parallel converter 242 to convert a symbol into parallel groups of time domain samples 244.

In one embodiment, first Fast Fourier Transform (FFT) element 247 may perform a FFT on known training symbols (e.g., the long training symbols) so that channel estimator 256 may generate a channel estimation for the channel. Channel estimator 256 may be responsive to fine timing signal 238 and may implement a least mean square (LMS) estimate in the frequency domain. Channel estimator 256 may also implement additional averaging and/or smoothing algorithms. The channel estimation may be viewed as a response function of the channel in the time domain, or may be viewed as a transfer function of the channel in the frequency domain. Channel estimator 256 may implement other algorithms for channel estimation including, for example, a maximum likelihood estimate in the frequency and/or the time domain.

In one embodiment, second FFT element 246 may perform an FFT on parallel groups of time domain samples 244 to generate frequency domain symbol modulated subcarriers 248. FFT element 246 may be responsive to fine timing signal 238 so that channel estimations may be made before data signal processing begins. In one embodiment, FFT element 246 may delay data signal processing by a time equaling approximately one OFDM symbol duration. Channel equalizer 254 may perform a channel equalization on frequency domain symbol modulated subcarriers 248 provided by FFT element 246. Channel equalizer 254 may generate channel equalized frequency domain symbol modulated subcarriers 258 using the channel estimation provided by channel estimator 256. For example, channel equalization in the frequency domain may be performed by division of the frequency domain subcarriers 248 with complex values that represent the channel estimation provided by channel estimator 256. Accordingly, the magnitudes of equalized frequency domain symbol modulated subcarriers 258 may be normalized and the phases of equalized frequency domain symbol modulated subcarriers 258 may be aligned to a zero origin to allow for further processing by demodulation 250. Although data symbol processing unit 206 is illustrated with two functionally separate FFT elements, on another embodiment, the functions of both FFT elements may be performed by common hardware elements.

Equalized frequency domain symbol modulated subcarriers 258 may be demodulated by demodulator 250 to produce a plurality of parallel symbols. Demodulator 250 may demodulate the subcarriers in accordance with a particular modulation order in which the transmitter modulated the subcarriers. Modulation orders, for example, may include binary phase shift keying (BPSK), which communicates one bit per symbol, quadrature phase shift keying (QPSK), which communicates two bits per symbol, 8PSK, which communicates three bits per symbol, 16-quadrature amplitude modulation (16-QAM), which communicates four bits per symbol, 32-QAM, which communicates five bits per symbol, and 64-QAM, which communicates six bits per symbol. Modulation orders may also include differentially coded star QAM (DSQAM). Modulation orders with lower and even higher communication rates may also be selected. The parallel symbols from demodulator 250 may be converted from a parallel form to a serial stream. A de-interleaving operation may also be performed on the serial stream. Decoder 252 may decode the serial stream to generate decoded serial bit stream 240. Although OFDM receiver 200 is illustrated as having several separate functional elements, one or more of the functional elements may be combined and may be implemented by combinations of software configured elements, such as processors including digital signal processors (DSPs), and/or hardware.

Figure 3:
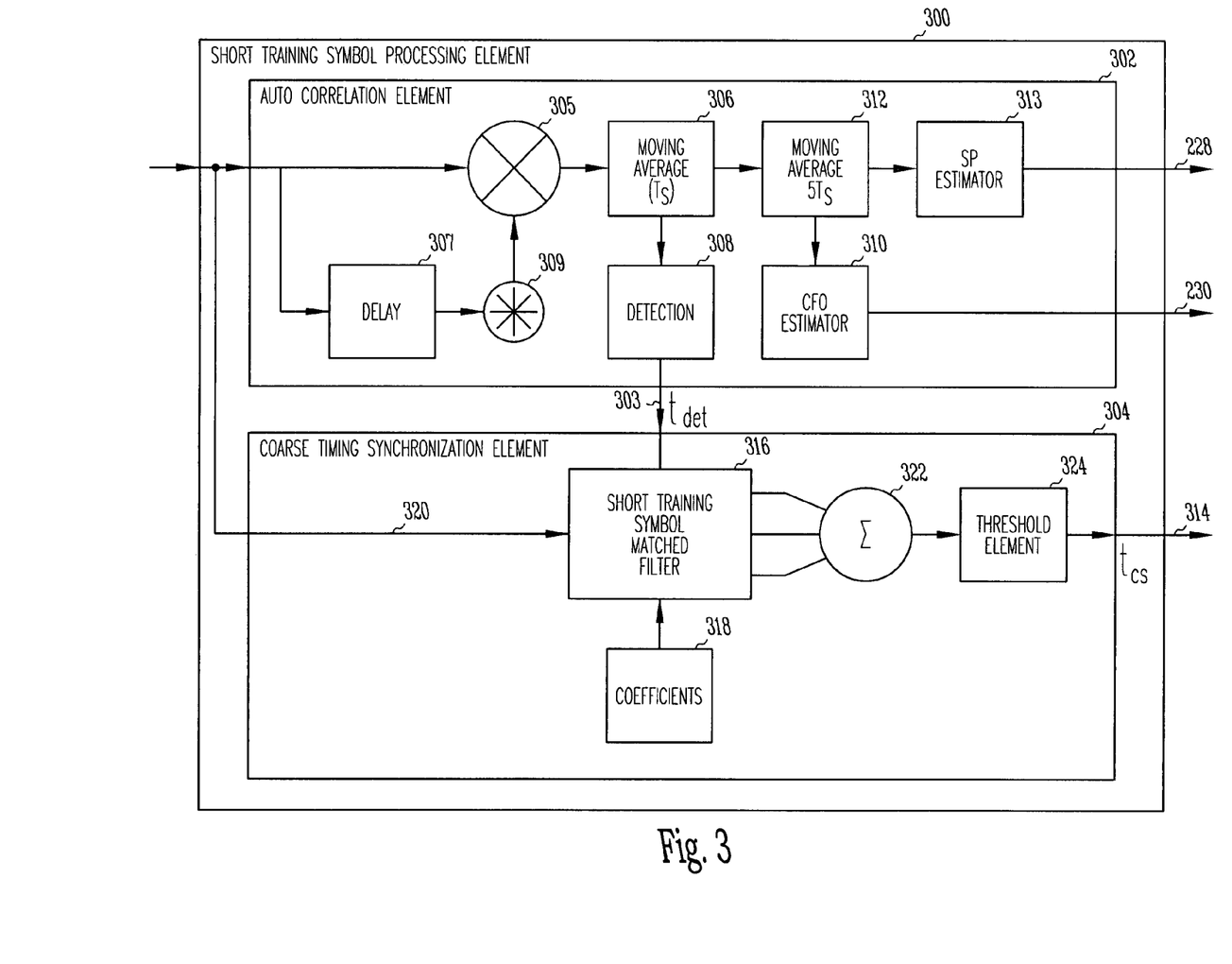
FIG. 3 is a simplified functional block diagram of a short training symbol processing element in accordance with an embodiment of the present invention.

FIG. 3 is a simplified functional block diagram of a short training symbol processing element in accordance with an embodiment of the present invention. Short training symbol processing element 300 may be suitable for use as short training symbol processing element 232 (FIG. 2) although other elements are also suitable. Short training symbol processing element 300 may include autocorrelating element 302 to preliminary detect an OFDM packet by correlating at least one of a plurality of short training symbols with a next of the short training symbols and generate initial packet detection signal 303 at time ($t_{det}$). Short training symbol processing element 300 may also include coarse timing synchronization element 304 to generate coarse-timing signal 314 at time ($t_{cs}$) from at least one of the short training symbols. The coarse-timing signal may indicate an actual detection of on OFDM packet. Autocorrelating element 302 may perform an autocorrelation with delay element 307, conjugation element 309 and correlator 305 implementing a time-moving average to preliminary detect the OFDM packet and generate initial packet detection signal 303. Time moving average element 306 may perform a time-moving average over durations substantially equaling the duration of a short training symbol. For a predetermined false alarm probability, detection element 308 may detect a packet using a predefined criterion, such as a Neyman-Pearson criterion, to detect correlations above a predetermined threshold. Coarse frequency offset (CFO) estimator 310 may generate a CFO estimate for use by the RF receive unit using a time-moving average of up to six or more of the short training symbols generated by timing moving average element 312. The CFO estimate may be provided as part of VCO signal 230 to control VCO 222 (FIG. 2).

Signal power (SP) estimator 313 may generate a signal power estimate for use by RF receive unit 202 (FIG. 2) using a time-moving average of up to six or more of the short training symbols generated by timing moving average element 312. The signal power estimate generated by SP estimator 313 may be provided as part of AGC signal 228 to control AGC element 218.

Coarse timing synchronization element 304 may include short training symbol matched filter 316 that may be matched to a duration of a short training symbol. Short training symbol-matched filter 316 may be responsive to initial packet detection signal 303 and may correlate input short training signals 320 with known OFDM training signals. Short training symbol matched filter 316 may sample the short training symbols over short sampling intervals and may correlate the sampled short training symbols with short matched filter coefficients 318. Short symbol matched filter coefficients 318 may be complex conjugates of a known short training signal. In one embodiment, short training symbol matched filter 316 samples at least one of the short training symbols during a short training symbol window beginning after approximately five of the short training symbols following receipt of initial packet detection signal 303. The short training symbol window may be approximately a duration of one of the short training symbols.

Coarse timing synchronization element 304 may also include short symbol combiner 322 and short symbol threshold device 324. Short symbol combiner 322 combines the correlation outputs from short training symbol-matched filter 316 from some of the short training symbols. Combiner 322 may include one or more coherent and/or non-coherent combiners depending on the accuracy desired for the coarse frequency offset estimate. The accuracy of the coarse frequency offset estimate may depend on a signal to noise ratio value, a number of short training symbols utilized for the estimate, and an estimation algorithm that may be used. Threshold device 324 detects a coarse synchronization time and may generate coarse-timing signal 314 when an output of combiner 322 exceeds a predetermined coarse-timing threshold. In one embodiment, short symbol combiner 322 may combine the correlation outputs from short training symbol-matched filter 316 from approximately three of the short training symbols.

Figure 4:
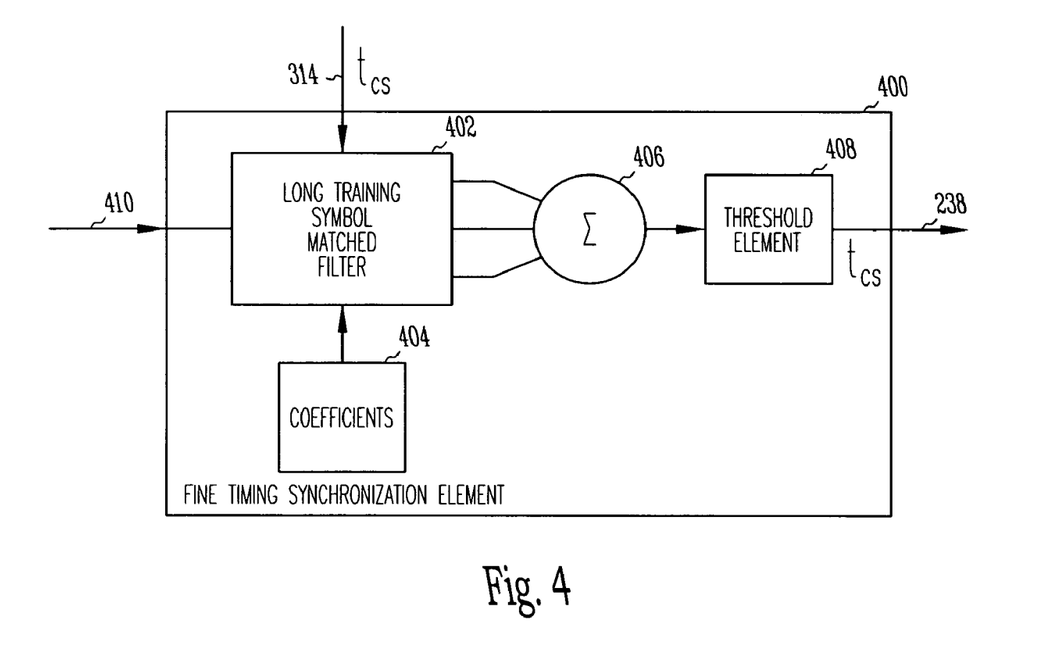
FIG. 4 is a simplified functional block diagram of a fine timing synchronization element in accordance with an embodiment of the present invention.

FIG. 4 is a simplified functional block diagram of a fine timing synchronization element in accordance with an embodiment of the present invention. Fine timing synchronization element 400 may be suitable for use as part of long training symbol-processing element 234 (FIG. 2) although other elements are also suitable. Fine timing synchronization element 400 may generate fine timing signal 238 at time ($t_{fs}$) from at least one of a plurality of long training symbols. Fine timing signal 238 may be used to initiate data symbol processing, for example, by FFT element 246 (FIG. 2). Fine timing signal 238 may also be used to initiate channel estimation (e.g., determining a channel transfer function), for example, by channel estimator 256 (FIG. 2). Fine timing synchronization element 400 may include long training symbol matched filter 402, which may be substantially matched to a duration of a long training symbol. Long training symbol-matched filter 402 may be responsive to coarse-timing signal 314 at time ($t_{cs}$) and may correlate input long training signals 410 with a known long OFDM training signal. Long training symbol matched filter 402 may sample the long training symbols over long sampling intervals and may correlate the sampled long training symbols with long matched filter coefficients 404. Long symbol matched filter coefficients 404 may be complex conjugates of the known long training signal. In one embodiment, long training symbol matched filter 402 samples at least one of the long training symbols during a long training symbol window following receipt of coarse timing signal 314. The long training symbol window may have a duration of approximately one of the long training symbols.

In one embodiment, the long training symbols may be four times longer than the short training symbols. In this embodiment, a time interval between peaks of long training symbol matched filter 402 may be four times larger than the time interval between peaks of short training symbol matched filter 316 (FIG. 3). Because the time interval of the long training symbol window may equal the duration of one long training symbol, abnormally large errors may be corrected. These errors may appear during short training sequence processing when a beginning of a packet is missed, or when noise causes a false initial packet detection.

Fine timing synchronization element 400 may also include combiner 406 and long symbol threshold device 408. Long symbol combiner 406 may combine the correlation outputs from long training symbol-matched filter 402 from at least some of the long training symbols. Combiner 406 may include one or more coherent and/or non-coherent combiners depending on the accuracy desired for the fine frequency offset estimate. The accuracy of the fine frequency offset estimate may depend on a signal to noise ratio value, a number of long training symbols utilized for the estimate, and an estimation algorithm that may be used. Threshold element 408 may detect a fine synchronization time and may generate fine timing signal 238 when an output of combiner 406 exceeds a predetermined fine timing threshold. In one embodiment, long symbol combiner 406 may combine the correlation outputs from long training symbol-matched filter 402 from approximately two of the long training symbols.

In one embodiment, fine timing signal 238 may indicate an end of the long training symbols and a beginning of data symbols. In this embodiment, FFT element 246 (FIG. 2) may begin to perform an FFT on data symbols in response to receipt of fine timing signal 238. Fine timing signal 238 may serve as a clock start signal for data signal processing. FFT element 246 (FIG. 2) may have an FFT duration over which the FFT is performed. In one embodiment, fine timing signal 238 may also serve as a clock-start signal for performing a channel estimation by FFT element 247 (FIG. 2) using one or more of the long training symbols. In one embodiment, the short training symbols may be approximately a quarter of the FFT duration, and the long training symbols may be approximately equal to the FFT duration, although this is not a requirement.

The use of symbol matched filter 402 and combiner 406 coupled with threshold element 408 may allow for improved estimation of a first path delay in a multipath environment. It may also remove the guard interval of an OFDM symbol helping avoid intersymbol interference.

In embodiments of the present invention, long training symbol matched filter 402 and short training symbol matched filter 316 (FIG. 3) may have different transient functions, may have a different number of taps, and may have different tap coefficients. In an OFDM embodiment, long training symbol matched filter 402 may be substantially matched to one of the long OFDM training symbols and short training symbol matched filter 316 (FIG. 3) may be substantially matched to one of the short OFDM training symbols.

In one embodiment, processing elements 232 and 234 (FIG. 2) may sample a baseband signal at approximately twenty mega-samples per second resulting in a sampling interval of approximately 50 ns. The sampling interval may be constant for signal processing up to FFT element 246 (FIG. 2). In another embodiment, the baseband signal may be sampled at a much higher rate reducing the sampling interval. In this embodiment, the baseband signal may be sampled at rates of up to forty mega-samples per second or even greater reducing the sampling interval down to 25 ns or less.

Figure 5A:
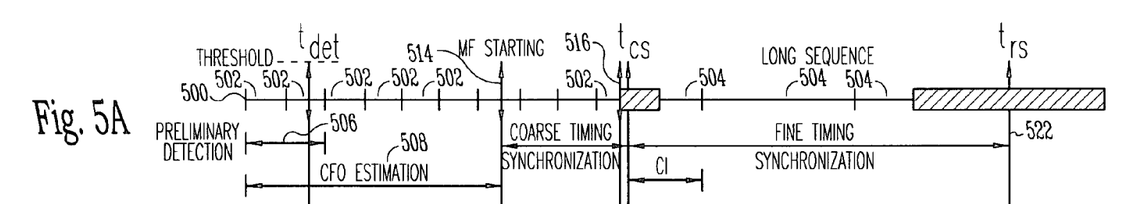
FIGS. 5A, 5B, 5C and 5D are timing diagrams illustrating the operation of embodiments of the present invention.
Figure 5B:
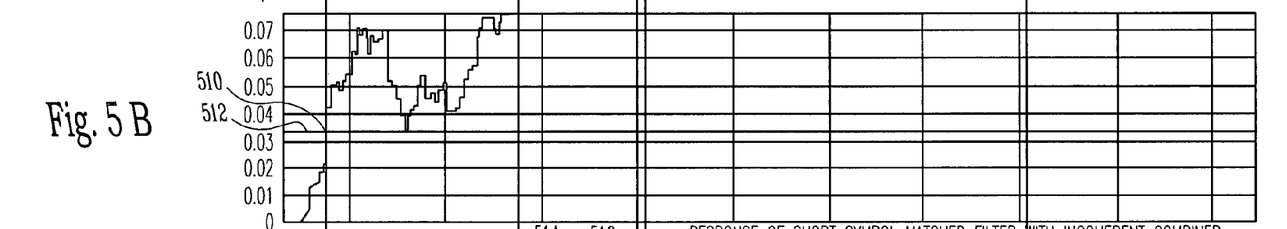
Figures 5C, 5D:
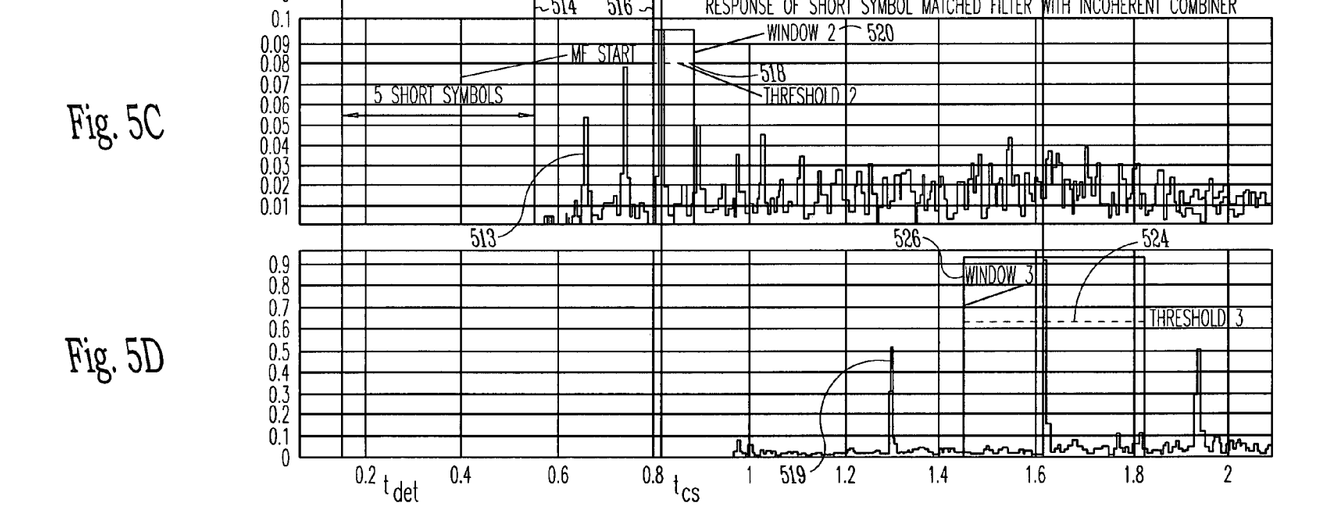

FIGS. 5A, 5B, 5C and 5D are timing diagrams illustrating the operation of embodiments of the present invention. FIG. 5A is a timing diagram illustrating short and long training sequences of OFDM training symbols in accordance with an embodiment of the present invention. FIG. 5B is a timing diagram illustrating preliminary packet detection in accordance with an embodiment of the present invention. FIG. 5C is a timing diagram illustrating coarse timing synchronization in accordance with an embodiment of the present invention. FIG. 5D is a timing diagram illustrating fine timing synchronization in accordance with an embodiment of the present invention. Training symbol sequences 500 may be comprised of a sequence of short training symbols 502 and a sequence of long training symbols 504. An autocorrelation element such as autocorrelation element 302 (FIG. 3) may perform preliminary packet detection 506 and CFO estimation 508 during a first portion of short training symbols 502. Preliminary packet detection may occur at time ($t_{det}$) 510 when threshold 512 is exceeded. The power and CFO estimation operations may be enabled until time 514 and may take up to seven or more of short training symbols 502 (see FIG. 5B). In one embodiment, time 514 may be five short training symbols after preliminary packet detection at time 510.

Coarse timing synchronization may be performed from time 514 to time 516 and may be performed, for example, by coarse timing synchronization element 304 (FIG. 3). At time 514, a short training symbol matched filter having output 513 may be started and a threshold element may detect a packet at coarse synchronization time 516 (tcs) when threshold 518 is exceeded within window 520 (see FIG. 5C). The threshold element may generate a coarse timing synchronization signal at time 516. In one embodiment, the coarse timing synchronization signal may serve as confirmation of OFDM packet detection.

Fine timing synchronization may be performed from time 516 to time 522 and may be performed, for example, by fine timing synchronization element 400 (FIG. 4). At time 516, a long training symbol matched filter having output 519 may be started and a threshold element may detect a packet a time 522 when threshold 524 is exceeded within window 526. The threshold element may generate a fine timing synchronization signal at time 522. Values for thresholds 512, 518 and 524 may be calculated for a given false alarm probability for packet detection and may utilize a predefined criterion, such as a Neyman-Pearson criterion. The fine timing synchronization signal may be used to initiate channel estimation and/or data symbol processing.

Figure 6:
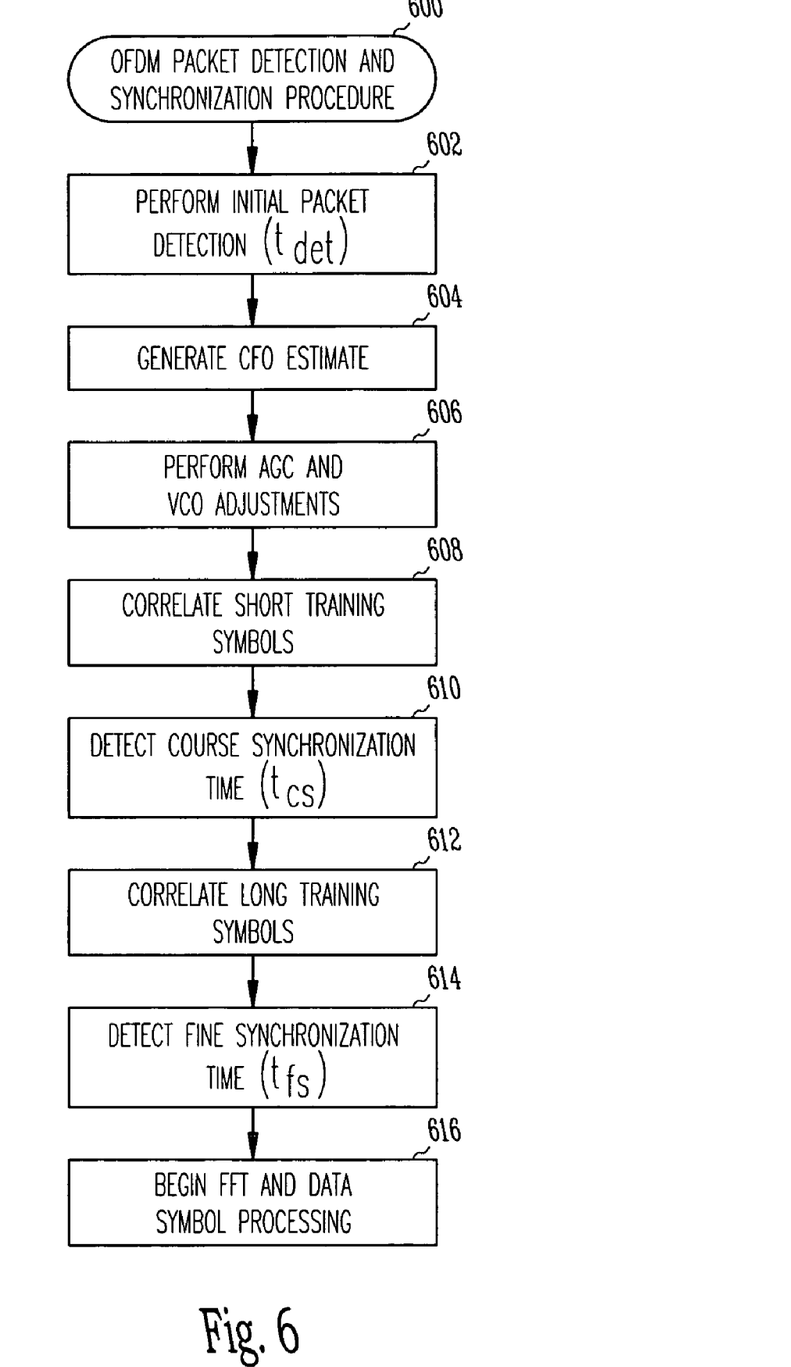
FIG. 6 is a flow chart of an OFDM packet detection and synchronization procedure in accordance with an embodiment of the present invention.

FIG. 6 is a flow chart of an OFDM packet detection and synchronization procedure in accordance with an embodiment of the present invention. OFDM packet detection and synchronization procedure 600 may be performed by an OFDM receiver, such as receiver 200 (FIG. 2) although other receivers are also suitable. Procedure 600 initially detects an OFDM packet and generates a fine timing synchronization signal to begin data symbol processing. Although the individual operations of procedure 600 are illustrated and described as separate operations, one or more of the individual operations may be performed concurrently and nothing requires that the operations be performed in the order illustrated. In accordance with one embodiment, operations 602 through 606 may be performed by autocorrelation element 302 (FIG. 3), operations 608 through 610 may be performed by coarse timing synchronization element 304 (FIG. 3), operations 612 through 614 may be performed by fine timing synchronization element 400 (FIG. 4), and operation 616 may be performed by data symbol processing unit 206 (FIG. 2).

Operation 602 performs an initial packet detection and may use at least one of a plurality of short training symbols. Operation 602 may be performed by an autocorrelating element, such as autocorrelation element 302 (FIG. 3), to preliminary detect an OFDM packet by correlating at least one of a plurality of short training symbols with a next of the short training symbols and generate an initial packet detection signal when, for example, threshold 512 (FIG. 5B) is exceeded.

Operation 604 generates a CFO estimate and may also generate power level estimates for use in controlling a VCO and an AGC of an RF receive unit such as RF receive unit 202 (FIG. 2). Operation 604 may also be performed by an autocorrelating element, such as autocorrelation element 302 (FIG. 3). Operation 606 adjusts the AGC and VCO during at least a portion of the short training symbols. The AGC and VCO setting may be held constant during the coarse timing and fine timing synchronization portions of procedure 600. The AGC and VCO setting may also be held constant for processing the remainder of the packet.

Operation 608 correlates short training symbols and may use a short training symbol-matched filter, such as matched filter 316 (FIG. 3) to produce correlation outputs for at least some of the short training symbols. Operation 610 detects a coarse timing synchronization time when one of the correlations exceeds a predetermined threshold, such as threshold 518 during window 520 (FIG. 5C).

Operation 612 correlates long training symbols and may use a long training symbol matched filter, such as matched filter 402 (FIG. 4) to produce correlation outputs for at least some of the long training symbols. Operation 614 detects a fine timing synchronization time when one of the correlations exceeds a predetermined threshold, such as threshold 524 during window 526 (FIG. 5D).

Operation 616 may be response to the fine timing synchronization time detected in operation 614 and may perform a FFT for channel estimation. Operation 616 may also begin data symbol processing with an FFT using the channel estimation. Operation 616 may include demodulating and decoding the symbol-modulated subcarriers extracted from the received OFDM signal.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. An apparatus comprising:
a coarse timing synchronization element to generate a coarse timing signal from at least one of a plurality of first training symbols, the coarse timing signal indicating detection of a packet; and
a fine timing synchronization element responsive to the coarse timing signal to generate a fine timing signal from at least one of a plurality of second training symbols, the fine timing signal to initiate data symbol processing,
wherein the coarse timing synchronization element includes a first training symbol matched filter substantially matched to the first training symbols, the first training symbol matched filter responsive to an initial packet detection signal, and
wherein the fine timing synchronization element includes a second training symbol matched filter substantially matched to the second training symbols.

2. The apparatus of claim 1 wherein the fine timing signal indicates approximately an end of the second training symbols, and wherein the receiver further comprises a Fast Fourier Transform (FFT) element to perform an FFT on the second training symbols to estimate a channel transfer function in response to receipt of the fine timing signal.

3. The apparatus of claim 2 wherein the FFT element has an FFT duration over which the FFT is performed, and wherein the first training symbols are approximately a quarter of the FFT duration, and the second training symbols are approximately equal to the FFT duration.

4. The apparatus of claim 1 further comprising an RF receive unit to generate a plurality of OFDM symbols from a received OFDM signal, the OFDM symbols comprising the plurality of first training symbols followed by the plurality of second training symbols and data symbols.

5. The apparatus of claim 1 further comprising an auto-correlating element to preliminary detect the OFDM packet by correlating at least one of the first training symbols with a next of the first training symbols and generate an initial packet detection signal.

6. The apparatus of claim 1 wherein the first training symbols are short training symbols, and the second training symbols are long training symbols having a duration of approximately four times that of the short training symbols, the long training symbols having a duration of approximately 4 microseconds.

7. An apparatus comprising:
a coarse timing synchronization element to generate a coarse timing signal from at least one of a plurality of first training symbols, the coarse timing signal indicating detection of a packet; and
a fine timing synchronization element responsive to the coarse timing signal to generate a fine timing signal from at least one of a plurality of second training symbols, the fine timing signal to initiate data symbol processing,
wherein the coarse timing synchronization element includes a first training symbol matched filter substantially matched to the first training symbols, the first training symbol matched filter responsive to an initial packet detection signal, and
wherein the first training symbols are comprised of a known first training signal, and wherein the first training symbol matched filter samples the at least one of the first training symbols over first sampling intervals and correlates the sampled first training symbols with first matched filter coefficients, the first matched filter coefficients being complex conjugates of the known first training signal.

8. The apparatus of claim 7 wherein the coarse timing signal indicates detection of an orthogonal frequency division multiplexed (OFDM) packet, and the fine timing signal initiates channel estimation, and
wherein the apparatus is a receiver to receive the OFDM packet.

9. The apparatus of claim 3 wherein the first training symbol matched filter samples the at least one of the first training symbols during a first training symbol window beginning after several of the first training symbols following receipt of the initial packet detection signal, the first training symbol window being approximately a duration of one of the first training symbols.

10. The apparatus of claim 7 wherein the coarse timing synchronization element includes a first symbol combiner and a first symbol threshold element, the first symbol combiner to combine correlation outputs from the first training symbol matched filter for at least some of the first training symbols, and wherein the threshold device to generate the coarse timing signal if an output of the combiner exceeds a predetermined coarse timing threshold.

11. The apparatus of claim 8 wherein the fine timing signal indicates approximately a beginning of data symbols of the OFDM packet, and
wherein the receiver further comprises a Fast Fourier Transform (FFT) element to perform an FFT on the data symbols in response to receipt of the fine timing signal, and
wherein the FFT element has FFT duration over which the FFT is performed, and wherein the first training symbols are approximately a quarter of the FFT duration, and the second training symbols are approximately equal to the FFT duration.

12. An apparatus comprising:
a coarse timing synchronization element to generate a coarse timing signal from at least one of a plurality of first training symbols, the coarse timing signal indicating detection of a packet; and
a fine timing synchronization element responsive to the coarse timing signal to generate a fine timing signal from at least one of a plurality of second training symbols, the fine timing signal to initiate data symbol processing,
wherein the fine timing synchronization element includes a second training symbol matched filter substantially matched to the second training symbols, the second training symbol matched filter responsive to the coarse-timing signal, and
wherein the second training symbols are comprised of a known second training signal, and wherein the second training symbol matched filter samples at least some of the second training symbols over second sampling intervals and correlates the sampled second training symbols with second matched filter coefficients, the second matched filter coefficients being complex conjugates of the known second training signal.

13. The apparatus of claim 12 wherein the second training symbol matched filter samples at least some of the second training symbols during a second training symbol window beginning after a predetermined number of the second training symbols following the coarse timing signal, the second training symbol window being approximately a duration of one of the second training symbols.

14. The apparatus of claim 12 wherein the fine timing synchronization element includes a second symbol combiner and a second symbol threshold element, the second symbol combiner to combine correlation outputs from the second training symbol matched filter for at least some of the second training symbols, and wherein the second symbol threshold device to generate the fine timing signal when an output of the second symbol combiner exceeds a predetermined fine timing threshold.

15. An apparatus comprising:
a coarse timing synchronization element to generate a coarse timing signal from at least one of a plurality of first training symbols, the coarse timing signal indicating detection of a packet;
a fine timing synchronization element responsive to the coarse timing signal to generate a fine timing signal from at least one of a plurality of second training symbols, the fine timing signal to initiate data symbol processing; and
an autocorrelating element to preliminary detect the OFDM packet by correlating at least one of the first training symbols with a next of the first training symbols and generate an initial packet detection signal,
the autocorrelating element performs an autocorrelation with a time-moving average to preliminary detect the OFDM packet and generate the initial packet detection signal, and
the autocorrelating element to generate a coarse frequency offset (CFO) estimate using a time-moving average of several of the first training symbols, the autocorrelating element to further generate a signal power estimate using a time-moving average of at least some of the first training signals, the signal power estimate being used for automatic gain control.

16. A method to detect and synchronize with a symbol boundary of OFDM packet comprising:
generating a coarse timing signal from at least one of a plurality of short training symbols, the coarse timing signal indicating detection of an orthogonal frequency division multiplexed (OFDM) packet; and
generating, in responsive to the coarse timing signal, a fine timing signal from at least one of a plurality of long training symbols, the fine timing signal to initiate data symbol processing and channel estimation,
wherein generating the coarse timing signal comprises sampling at least one of the short training symbols with a short training symbol matched filter, and
wherein generating the fine timing signal comprises sampling at least one of the long training symbols in response to receipt of the coarse-timing signal with a long training symbol matched filter.

17. The method of claim 16 wherein the short training symbols are comprised of a known short training signal, and wherein the method further comprises:
sampling, in response to an initial packet detection signal, at least one of the short training symbols over short sampling intervals; and
correlating the sampled short training symbols with short matched filter coefficients, the short matched filter coefficients being complex conjugates of the known short training signal.

18. The method of claim 17 wherein sampling further comprises sampling the at least one of the short training symbols with the short training symbol matched filter during a short training symbol window beginning after several of the short training symbols following receipt of the initial packet detection signal, the short training symbol window being approximately a duration of one of the short training symbols; and
combining correlation outputs from the short training symbol matched filter for at least some of the short training symbols; and
generating the coarse timing signal when a correlation output exceeds a predetermined coarse timing threshold.

19. The method of claim 16 wherein the fine timing signal indicates approximately a beginning of data symbols of the OFDM packet, and wherein the method further comprises:
performing a Fast Fourier Transform (FFT) on the data symbols in response to receipt of the fine timing signal.

20. The method of claim 16 wherein the fine timing signal indicates approximately an end of the long training symbols, and wherein the method further comprises:
performing a Fast Fourier Transform (FFT) on at least some of the long training symbols in response to receipt of the fine timing signal to estimate a channel transfer function.

21. A method to detect and synchronize with a symbol boundary of OFDM packet comprising:
generating a coarse timing signal from at least one of a plurality of short training symbols, the coarse timing signal indicating detection of an orthogonal frequency division multiplexed (OFDM) packet;
generating, in responsive to the coarse timing signal, a fine timing signal from at least one of a plurality of long training symbols, the fine timing signal to initiate data symbol processing and channel estimation, the long training symbols comprising a known long training signal;
sampling, in response to receipt of the coarse-timing signal with a long training symbol matched filter, at least some of the long training symbols over long sampling intervals; and
correlating the sampled long training symbols with long matched filter coefficients, the long matched filter coefficients being complex conjugates of the known long training signal,
wherein sampling comprises sampling at least some of the long training symbols during a long training symbol window beginning after a predetermined number of the long training symbols following the coarse timing signal, the long training symbol window being approximately a duration of one of the long training symbols, and
wherein correlating comprises combining correlation outputs from the long training symbol matched filter for at least some of the long training symbols, and generating the fine timing signal when an output of the long symbol combiner exceeds a predetermined fine timing threshold.

22. A method comprising:
auto-correlating a received signal to initially detect a packet, the packet preceded by a preamble comprised of a plurality of first training symbols and a plurality of second training symbols;
performing a coarse timing synchronization in response to initial detection of the packet by filtering at least some of the short training symbols with a short training symbol matched filter;

performing a fine timing synchronization in response to the coarse timing synchronization by filtering at least some of the long training symbols with a long training symbol matched filter; and initiating data symbol processing and channel estimation in response to the timing synchronization.

23. The method of claim 22 wherein auto-correlating comprising auto-correlating a received orthogonal frequency division multiplexed (OFDM) signal to initially detect an OFDM packet, and wherein the first training symbols are short OFDM training symbols, and the second training symbols are long OFDM training symbols.

24. A method comprising:
auto-correlating a received signal to initially detect a packet, the packet preceded by a preamble comprised of a plurality of first training symbols and a plurality of second training symbols;
performing a timing synchronization using at least one of the first training symbols and at least one of the second training symbols; and
initiating data symbol processing and channel estimation in response to the timing synchronization,
wherein auto-correlating comprising auto-correlating a received orthogonal frequency division multiplexed (OFDM) signal to initially detect an OFDM packet, and wherein the first training symbols are short OFDM training symbols, and the second training symbols are long OFDM training symbols, and
wherein performing the timing synchronization comprises:
performing a coarse timing synchronization in response to initial detection of the packet using at least some of the short training symbols; and
performing a fine timing synchronization in response to the coarse timing synchronization using at least some of the long training symbols,
wherein auto-correlating comprises correlating one of the short symbols with a next short symbol to detect the packet when a correlation magnitude exceeds a predetermined threshold, and wherein the method further comprises:
performing a coarse frequency offset (CFO) estimation and a signal power estimation during a first portion of the short training symbols to adjust, respectively, a VCO element and an AGC element of a receiver, and wherein
performing the coarse timing synchronization correlates the at least some of the short training symbols with a first symbol matched filter matched to one of the short training symbols, and performing the fine timing synchronization correlates the at least some of the long training symbols with a second symbol matched filter matched to one of the long training symbols.

25. An orthogonal frequency division multiplex (OFDM) receiver system comprising:
a dipole antenna to receive signals that include an OFDM packet;
a first symbol matched filter to coarsely detect a symbol boundary of the OFDM packet by correlating short training symbols;
a second symbol matched filter to finely detect the symbol boundary by correlating long training symbols; and
a data symbol-processing element to perform a channel estimation and to perform data symbol processing on the OFDM packet in response to fine packet detection by the second symbol matched filter.

26. The receiver system of claim 25 further comprising:
a first combiner to combine correlation outputs from the first symbol matched filter;
a second combiner to combine correlation outputs from the second symbol matched filter; and
a autocorrelation element to initially detect the OFDM packet with an autocorrelation processes using at least some of the short training symbols.

27. The receiver system of claim 25 wherein:
the short training symbols are comprised of a known short training signal, and wherein the short training symbol matched filter samples the at least one of the short training symbols over short sampling intervals and correlates the sampled short training symbols with short matched filter coefficients, the short matched filter coefficients being complex conjugates of the known short training signal, and wherein the short training symbol matched filter samples the at least one of the short training symbols during a short training symbol window beginning after several of the short training symbols following receipt of an initial packet detection signal, the short training symbol window being approximately a duration of one of the short training symbols, and
wherein the long training symbols are comprised of a known long training signal, and wherein a long training symbol matched filter samples at least some of the long training symbols over long sampling intervals and correlates the sampled long training symbols with long matched filter coefficients, the long matched filter coefficients being complex conjugates of the known long training signal, and wherein the long training symbol matched filter samples at least some of the long training symbols during a long training symbol window beginning after a predetermined number of the long training symbols following the coarse timing signal, the long training symbol window being approximately a duration of one of the long training symbols.

* * * * *